United States Patent [19]
Bailey et al.

[11] 3,960,435
[45] June 1, 1976

[54] CARTRIDGE FUSE CLIP WITH REJECTION MEANS

[75] Inventors: William R. Bailey, Chicago, Ill.;
Stephen H. Krumm, Kenosha, Wis.;
David R. Marach, Sleepy Hollow, Ill.

[73] Assignee: Underwriters Safety Device Company, Chicago, Ill.

[22] Filed: Feb. 6, 1975

[21] Appl. No.: 547,480

[52] U.S. Cl............................ 339/186 R; 339/258 F
[51] Int. Cl.²........................................... H01R 13/64
[58] Field of Search ........... 339/147, 150, 184, 186, 339/258, 259

[56] References Cited
UNITED STATES PATENTS

| | | | |
|---|---|---|---|
| 2,943,295 | 6/1960 | Stewart | 339/258 F |
| 2,958,020 | 10/1960 | Eannarino | 339/258 F |
| 3,890,032 | 6/1975 | Tillson | 339/258 F |

OTHER PUBLICATIONS
Patent Abstract, No. 193,380, Page et al., 3-24-1973, Holding Clip for Special Fuses or Electrical Relays.

*Primary Examiner*—Joseph H. McGlynn
*Attorney, Agent, or Firm*—Lockwood, Dewey, Zickert & Alex

[57] ABSTRACT

A fuse clip which accepts and retains the annularly grooved end cap of a current limiting ferrule cartridge fuse inserted therein, and which rejects the insertion of other classes of ferrule cartridge fuses. The fuse clip of the invention includes a central mounting portion and a pair of arm members extending in like direction from opposite sides of the mounting portion. The arm members include rejection means positioned on each arm member to co-act with the annular groove in the current limiting fuse end cap and allow it to be inserted and retained in the clip. The rejection means prevents the seating of a conventional fuse end cap in the clip and exerts a force on the cap tending to push it out of the clip.

4 Claims, 13 Drawing Figures

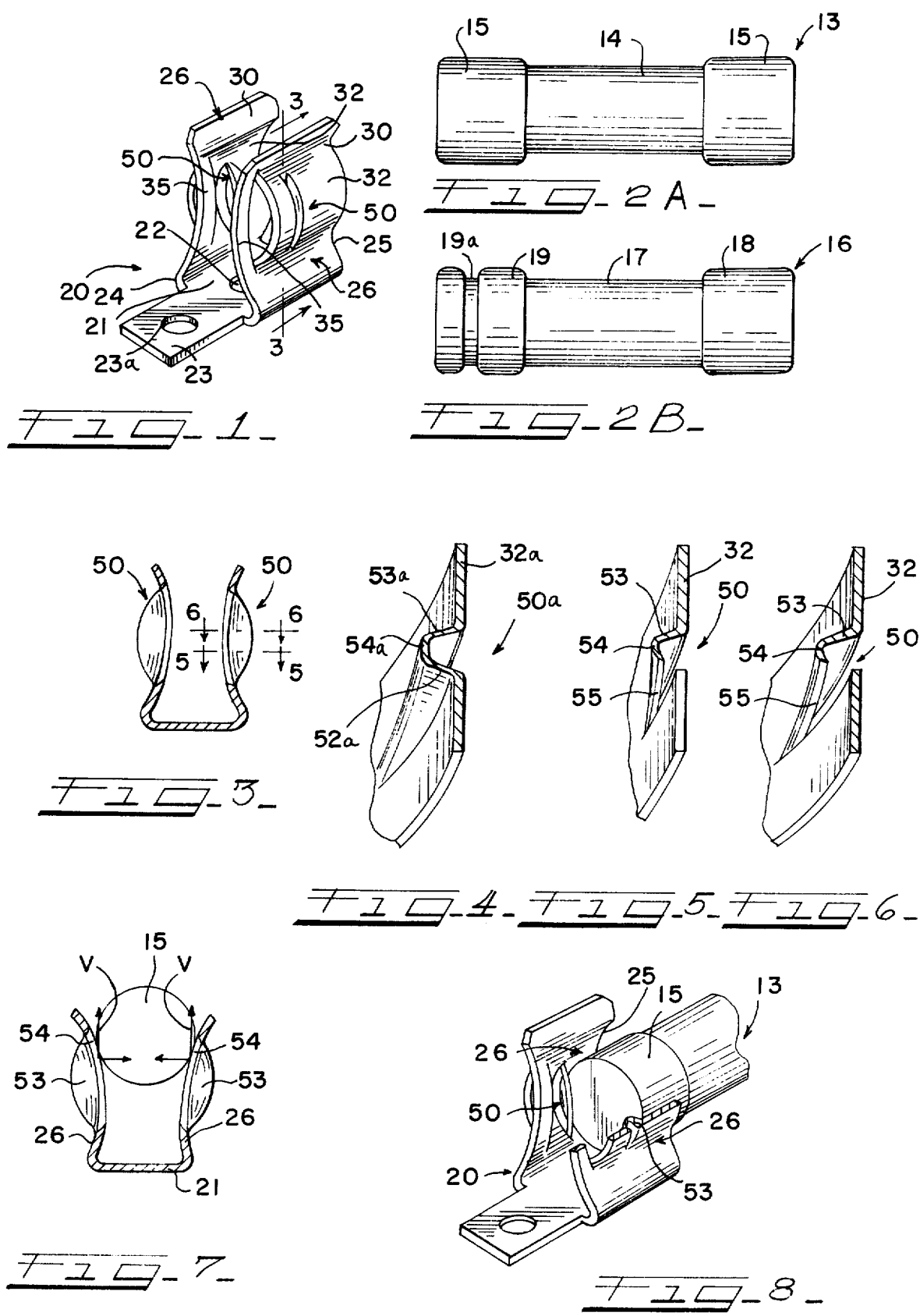

CARTRIDGE FUSE CLIP WITH REJECTION MEANS

BACKGROUND OF THE INVENTION

This invention relates to cartridge fuse clips to be positioned in an electrical circuit and to releasably retain one end of a ferrule cartridge fuse positioned in the circuit. More specifically, the invention relates to a cartridge fuse clip which is capable of accepting and retaining the grooved end of one class of cartridge fuse and which is capable of rejecting the insertion of a cartridge fuse of any other class designation.

The structure of cartridge fuse clips is at least partially dictated by the structure of the cartridge fuse itself. Standards have been developed for governing fuses. These standards were first developed shortly after the turn of the century and incorporated as a part of the NATIONAL ELECTRIC CODE (NEC).

For approximately 50 years after the standard was adopted, however, it was not expanded to provide additional governance covering newer, more technologically sophisticated fuses. During the 1950's those in the industry became increasingly aware of the need for an expanded standard. Electrical associations and independant testing laboratories published tables of fuse dimensions and standards for low voltage fuses. The NEC dropped the table of fuse dimension from the 1959 issue of the code, and concentrated on safety requirements.

In 1959 the NEC included for the first time two new safety requirements regarding fuses. The two new requirements state that (1) fuse holders for current limiting fuses shall not permit insertion of fuses that are not current limiting, and (2) that the fuses shall be plainly marked with the ampere rating, voltage rating, interrupting rating where other than 10,000 amperes, "current limiting" were applicable, and the name or trademark of the manufacturer.

This requirement created a dilemma for the whole electrical industry. After months of committee studies and discussions, a solution was arrived at by forging a loophole in the requirement. The loophole solution simply eliminated the classification current limiting. A new classification was developed for high current interrupting fuses. While these fuses may also have current limiting characteristics, they can be used in standard fuse holders by merely marking them high current interrupting. Through this loophole, electrical manaufacturers have avoided the necessity of providing fuse clips capable of rejecting noncurrent limiting fuses.

Recently, the electrical associations and independent testing laboratories have begun to face up to the letter and scope of the requirements and have circulated proposed standards for a new class of fuses, identified as class R, which are current limiting with high current interrupting ratings. These fuses are the same size as the conventional fuses, such as the standard class H fuse, but are designed with an annular groove around one ferrule of the cartridge. Fuse clips for these class R fuses must accept the grooved end cap but must also reject the insertion of an identically sized conventional cartridge fuse without a groove in the end cap.

SUMMARY OF THE INVENTION

Applicant's invention is a fuse holding clip which accepts the insertion of one class of ferrule type fuse cartridges and rejects the insertion therein of all other classes of ferrule fuse cartridges. Applicant's invention includes a strip of electrically conductive material with a mounting portion centrally therein and a pair of fuse engaging arm members extending in like direction generally perpendicular from the mounting portion. Each arm has a lip at it's distal end for assisting in spreading apart the arm members to allow the insertion of the cartridge fuse into the clip. A concave fuse seating portion is located in each arm between the lip and the mounting portion for receiving and conductively engaging a cartridge fuse in surface contact. Each arm also includes a fuse rejection means for preventing the insertion of a cartridge fuse other than that of designated configuration. The rejection means projects inwardly of the seating portion mediate a first and opposite second end of the clip.

It is therefore an object of the invention to provide a fuse holding clip which accepts the insertion therein of one classification of ferrule type fuse cartridges.

Another object of the invention is the provision of a fuse holding clip which rejects the insertion of other classifications of ferrule fuse cartridges therein.

A still further object of the invention is the provision of a ferrule cartridge fuse clip having a fuse rejecting feature and which retains outer parameters similiar to conventional cartridge fuse clips thus allowing easy replacement of a conventional fuse clip by a fuse clip of the invention in a circuit where appropriate.

BRIEF DESCRIPTION OF THE DRAWINGS

Other objects, features, and advantages of the invention will be apparent from the following detailed disclosure taken in conjunction with the accompanying drawings, wherein like reference numerals refer to like parts, in which:

FIG. 1 is a perspective view of the cartridge fuse clip of the invention including a fuse rejection means;

FIG. 2A is an elevational view of a typical ferrule fuse cartridge of conventional configuration;

FIG. 2B is an elevational view of a ferrule fuse cartridge of configuration designated current limiting including an inwardly extending annular groove in one ferrule thereof:

FIG. 3 is a cross-sectional view taken along line 3—3 of FIG. 1;

FIG. 4 is a cross-sectional view of one structure of the invention taken along a line substantially similiar to line 6—6 on FIG. 3;

FIG. 5 is a cross-sectional view taken along either line 5—5 of FIG. 3;

FIG. 6 is a cross-sectional view taken along line 6—6 of FIG. 3;

FIG. 7 is a cross-sectional view substantially similiar to FIG. 3 showing the rejecting force generated when a conventional ferrule cartridge fuse is inserted into the clip of the invention;

FIG. 8 is a perspective view of one embodiment of the invention wherein it prevents the sideways insertion of a cartridge fuse into the clip.

DETAILED DESCRIPTION OF INVENTION

Figures 9, 10:
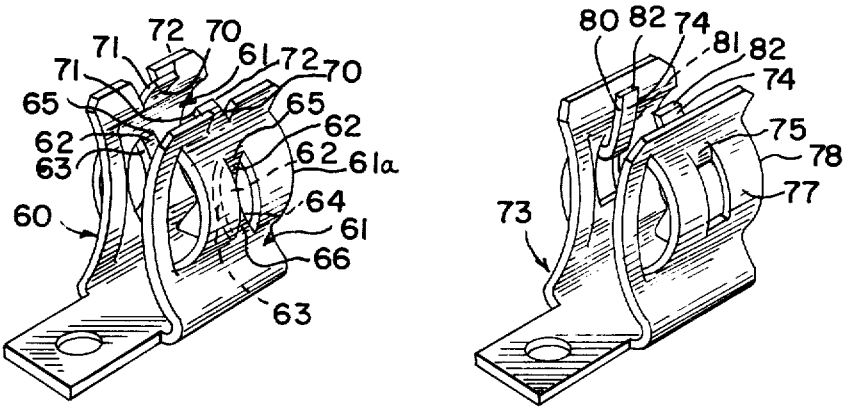
FIG. 9 is a perspective view of a second embodiment of the cartridge fuse clip of the invention.
FIG. 10 is a perspective view of a third embodiment of the cartridge fuse clip of the invention.

Referring to FIGS. 2A and 2B a conventional ferrule cartridge fuse is shown in FIG. 2A, generally indicated at 13. It is substantially cylindrical in structure having an oblong central fuse containing portion 14 and two outer contact end caps 15—15. In this fuse both end caps are identical in structure and the insertion of either end cap into a fuse clip need not be selective. A current limiting fuse complying with the proposed standard is shown in FIG. 2B, and generally indicated at 16. This ferrule cartridge fuse also includes a cylindrical fuse containing portion 17 and one end cap 18 similiar to end caps 15—15 in the ferrule cartridge fuse 13. However, the proposed ferrule cartridge fuse has a second end cap 19 which includes an inwardly extending annular groove 19a parallel to and inwardly spaced apart from the distal end of cap 19. According to the standard, the annular groove 19a is to be utilized with a complementary cartridge fuse clip for use in circuits where only current limiting fuses are acceptable. The complementary portion of the cartridge fuse clip is also to provide means for rejecting other than current limiting ferrule cartridge fuses, i.e., such as that shown in FIG. 2A.

Referring to FIG. 1, the cartridge fuse clip having the rejection feature of the invention is indicated generally at 20. Portions of the fuse clip which are conventional and old in the art will not be discussed in great detail. Cartridge fuse clip 20 includes a central base mounting portion 21 which is generally flat having a central mounting hole 22 located centrally therethrough for mounting the clip of the invention to an external member by means of a screw, bolt, or the like. In this embodiment the mounting portion 21 includes a terminal connector tab 23 extending from a first end 24 thereof for facilitating the connection of an electrical terminal to the fuse clip by means of a terminal connector (not shown) attached to tab 23 through mounting hole 3a. It should be noted that the terminal connecting tab 23 may be of any convenient shape as long as it provides a means thereon for attaching a terminal connector thereto. The first end 24 of the fuse clip is an outward end relative a pair of fuse clips necessary in a circuit. A fuse is inserted in and between the pair of clips. A second end 25 is opposite the first end and is an inward end relative the pair of clips. The ferrule cartridge fuse clip 20 also includes a pair of fuse engaging side members, generally at 26—26 which extend in like direction generally perpendicular to the central mounting portion from opposing sides thereof. Side members 26—26 have at their distal ends fuse receiving lip portions 30—30 which are acutely angled upwardly and outwardly from the center of the clip so as to aide the passage of a fuse cartridge therethrough. Between each lip portion 30 and the central mounting portion 21 is a semicylindrical concave portion 32—32, each concave portion faces inwardly of the clip and has a radius approximating that of a ferrule cartridge fuse to be positioned therein which provides a surface contact between the fuse and fuse clip. The concave portions 32—32 in clips 20—20 are hereafter collectively referred to as the fuse seating portion. At the first end 24 of each arm member 26 is an end stop rail 35 which is outside of that portion normally traversed by a ferrule fuse cartridge designed to fit into said clip when it is mounted on a fuse panel (not shown). Stop rail 35 prevents the successful insertion into the fuse seating portion of the clip of an improper size fuse cartridge which is overly long.

Applicant's invention resides in a means for accepting the insertion of a cartridge fuse such as that shown in FIG. 2B into the cartridge fuse clip 20 while rejecting the insertion of a conventional cartridge fuse (FIG. 2A). This rejection means is located at the concave portions 32—32 of the arm members 25—25, and is generally indicated at 50—50, also shown most clearly in FIGS. 3–8. The rejection means of the invention 50 is an inwardly extending ridge which is also oriented generally parallel the first and second clip ends 24, 25 respectively.

Two preferred ridge structures of the rejection means of the invention are shown in FIGS. 4, and FIGS. 5–6. In FIG. 4, the structure is continuous horizontally (as shown) across a ridge 50a. The ridge structure of FIG. 4 includes first and second side walls 52a, 53a respectively which are drawn or stretched by the ridge forming means (not shown). Connecting the first and second side walls and forming the leading surface of the ridge is main wall portion 54a. In this preferred embodiment main wall 54a has approximately the same thickness as concave portion 32a while first and second side walls 52a, 53a respectively, are thinner because they are drawn. By drawing first and second side walls 52a, 53a and stretching them, the ridge 50a becomes stress hardened and cannot be returned to it's original shape as a segment of the concave portion of the arm member. In the proposed standard for fuses, a rejecting means in a fuse clip must not be able to be defeated by using ordinary hand tools on the fuse clip itself.

In FIGS. 5 and 6 the preferred structure of FIG. 1 is shown. This structure is similiar to the structure shown in FIG. 4, however, it includes only one side wall, here second side wall 53 and main wall portion 54. Instead of having a first side wall as the structure in FIG. 4, the structure in FIGS. 5 and 6 includes a sheared end surface 55 at one edge of main wall portion 54. Sheared end surface 55 may be slightly curved vertically because of distortion occurring during the drawing operation. It should be noted that the second side wall may be eliminated and the fist side wall retained within the scope of this disclosure. FIGS. 5 and 6 show the difference in the inward extension of the second wall 53 along the ridge 50. Second wall 53 is preferably most extended from concave portion 32 in the vertical (as shown) center of the ridge (FIG. 6) and diminishes in either direction therefrom (FIG. 5).

While the difference between the ridge shown in FIG. 4 and that shown in FIGS. 5 and 6 may be caused by differing tools used to form the ridge, the differing structure can also be caused by differing composition materials or material hardnesses. The conductive material of which the clip is made, usually brass, copper, or steel, may have varying hardnesses which affect it's malleability, i.e., the ability to be stretched and drawn before shearing under stress. While the common clip materials are noted for malleability, the basic clip structure also requiries resiliency and springlike qualities so that the arm members spread apart and rebound around the fuse cartridge which is inserted therein. This resiliency or springlike quality requires a relatively hard form of the basic material used. Therefore, some clip materials may not be drawn sufficiently to form the ridge 5a shown in FIG. 4. The ridge 50 shown in FIGS. 5 and 6 may be an optimum with harder clip materials.

Referring to FIG. 7, the forces the rejection means of the invention are capable of imposing on an improper fuse inserted therein are shown. As the conventional end cap 13 is passed between the lips 30—30 they spread apart. However, as the fuse end cap 15 is thrust into the fuse seating portion of the clip, it rides upon the main wall portion 54 of each ridge rather than making surface contact with the inner surface of concave portion 32. Since the ridge protrudes from the concave portion, the arm members 26—26 do not spring back to engage the end cap 15 and retain it within the clip. The ridge 50 however, does exert a force upon the end cap 15 as arm members 26—26 attempt to return to the non-stress position shown in FIG. 3. The vector force exerted upon the end cap 15 by each ridge 50 contains a vertical component V which forces the end cap 15 back outward to the lips 30—30 of the clip.

Another objective of the proposed fuse standard is to provide a fuse clip which prevents the sideways insertion of an improper fuse past the second end 25 of the clip rather than through the lips 30—30. As shown in FIG. 8, a fuse 13 which is inserted past the second end 25 of the fuse clip 20 is stopped from fully seating by the second side wall 53 of each ridge 50 thereby preventing the opposite fuse end cap 15 from seating in the other fuse clip in the circuit (not shown).

In FIGS. 9–12 cartridge fuse clips embodying different rejection means are shown. The portions of each fuse clip which are conventional will not be discussed in detail. A second embodiment of the invention is shown in FIG. 9 and indicated generally at 60. Rejection means of the second embodiment includes two structures on each arm member, indicated generally at 61—61. The first structure is an inwardly extending vertical rib 62 positioned in approximately the same location in the second embodiment as the ridge rejection means 50 of the first embodiment. Rib 62 has first and second sheared ends 63 and 64 respectively, which are parallel and spaced apart sufficiently to substantially fill a portion of the annular groove 19a of the current limiting cartridge fuse 16 which may be inserted in clip 60. Rib 62 is connected to the concave portion of arm member 61 at upper and lower junctures 65, 66 respectively. The function of rib 62 is to seat in groove 19a of the current limiting fuse and to prevent the sideways insertion of any cartridge fuse through the second end 61a of the clip 60. In order to reject the insertion of an improper fuse through the lips at the top portion of each arm member, a second structure, an inwardly extending tab 70—70 is positioned directly above rib 62 in the lip portion of each arm member 61. The inwardly extending tab 70 has sheared side edges 71 and 72 respectively which are aligned with side edges 63, 64 respectively of rib 62. If an attempt is made to push a conventional fuse downward through the lips of the clip the inwardly extending tab 70 will engage the end cap of the fuse and the arm members will not spread outwardly sufficiently to allow the fuse to pass by the lips without permanently distorting the clip.

In FIG. 10 a third embodiment of the rejection cartridge fuse clip is shown, generally at 73. The rejection means of clip 73 is a single upwardly and inwardly extending rib member 74—74 mounted on each arm member 76. Each rib member 74 includes a mounting portion 75 attached to the upper end of the concave portion 77 of each arm member. Rib member 74 has parallel sides 80, 81 also spaced so as to substantially fill a portion of the groove 19a in a current limiting fuse to be inserted in the clip. The rib member distal ends 82—82 reject the insertion of a conventional cartridge fuse through the top of the clip, while the lower portion of the rib adjacent the mounting portion extends inwardly sufficiently to prevent the insertion of a fuse past the clip second end 78.

Figures 11, 12:
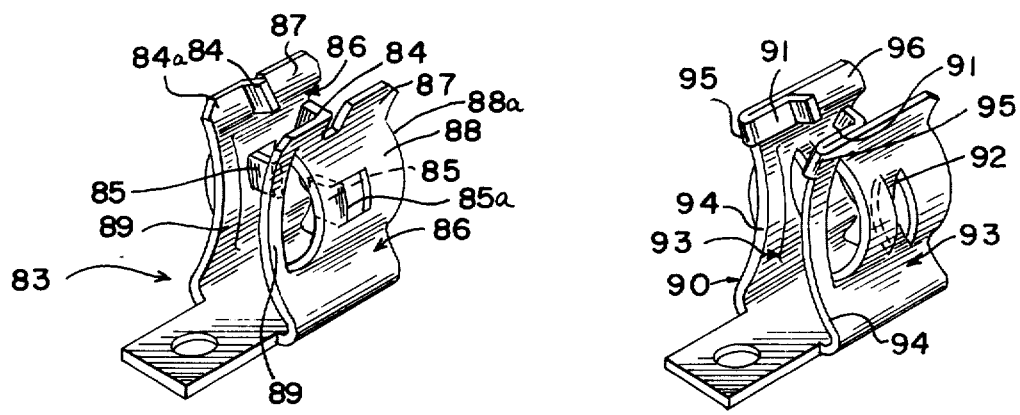
FIG. 11 is a perspective view of a fourth embodiment of the cartridge fuse clip of the invention.
FIG. 12 is a perspective view of a fifth embodiment of the cartridge fuse clip of the invention.

In FIG. 11 a fourth embodiment of the invention is shown at 83. In this embodiment two inwardly extending tabs 84 and 85 are positioned on each arm member 86. The upper tab extends inwardly of the lip portion 87 of each arm member and the lower tab extends inwardly of the concave portion 88 of each arm member. Both tabs 84 and 85 are positioned mediately between the clip second end 88a and outside end stop 89 such that a current limiting ferrule cartridge fuse can be inserted downwardly through the lips of the clip into the concave fuse seating portion. In this embodiment the inwardly extending tabs have vertical base portions 84a, 85a, which connect the respective tabs to the arm member lip 87 and concave portion 88 respectively. Lower tab 85a prevents a cartridge fuse from being inserted sideways past the second end 88Pa of the clip and tab 84a prevents a conventional ferrule cartridge fuse from being inserted through the lips toward the concave fuse seating portion. It should be noted that while the tabs in FIG. 11 are located so as to contact the outward most edge of groove 47 in a current limiting ferrule cartridge fuse, the tabs could be oriented to engage the innermost edge of fuse 47, or the base portions could be horizontal with the tab shape approximating the cross-sectional outline of groove 47 within the scope of the invention.

In FIG. 12 a fifth embodiment of the cartridge fuse clip of the invention is shown, generally at 90. This embodiment also has an upper and lower rejection 91—92 means respectively on each arm member, indicated generally at 93. The lower rejection means is substantially identical to rejection means 62 in the second embodiment previously discussed in FIG. 9. The upper rejection means 91 extends inwardly of the lip of each arm member directly above lower rejection means 92. However, the rejection means 91 is attached to the lip at the first clip end 94 rather than mediate it's first and second ends in the embodiment of FIG. 11. The upper rejection means 91 is an elongate tab which is approximately the same thickness as the lip portion and is bent 180° at it's base 95 so as to be parallel and adjacent the inner surface of each arm member lip 96. At it's distal end the tab 91 is bent inwardly in a position similiar to tab 84 as shown in FIG. 11, ie, directly above lower rib 92. The upper and lower tabs perform the same function as the upper and lower tabs of the embodiments previously discussed.

As will be appreciated, modifications and variations may be made without departing from the spirit of the scope of the present invention as defined in the appended claims.

I claim:

1. In a ferrule cartridge fuse clip including
a central base portion having means thereon for aiding in mounting said clip to an external member;
a terminal connector portion in communication with said base portion;
and a pair of fuse grasping arm members spaced apart and extending in like direction from opposing sides of said base portion for accepting and retaining an end cap portion of a ferrule cartridge fuse, each said grasping arm member including a concave semi-cylindrical portion facing inwardly of said clip for providing a surface contact with the end cap of a ferrule cartridge fuse;

the improvement comprising ridge means on each said arm member for accepting one classification of ferrule cartridge fuse and rejecting other classifications of ferrule cartridge fuses, said ridge means including an elongate segment of each said concave portion located mediate a first and a second end of said clip, and oriented generally parallel therewith, said segment extending inwardly of the remainder of said concave portion, and being stretched and stress hardened along at least one of its elongate parameters.

2. The fuse clip called for in claim 1 wherein each said grasping arm member includes a lip located at the distal end of said arm member for guiding the insertion of a ferrule cartridge fuse into said clip, and said ridge means further includes a segment of each said lip which is aligned with said elongate segment of said concave portion and extends inwardly forming a tab for allowing the insertion of said grooved end cap of said one classification of ferrule cartridge fuse into said clip past said lip, and for rejecting the insertion of any other classification of ferrule cartridge fuse into said clip past said lip.

3. The fuse clip called for in claim 1 wherein said segment is stretched and work hardened along both of its elongate parameters.

4. The fuse clip called for in claim 1 wherein one of the elongate parameters of said elongate segment defines a sheared end surface.

* * * * *

UNITED STATES PATENT AND TRADEMARK OFFICE
CERTIFICATE OF CORRECTION

PATENT NO. : 3,960,435
DATED : June 1, 1976
INVENTOR(S) : Bailey, Krumm, and Marach It is certified that error appears in the above-identified patent and that said Letters Patent are hereby corrected as shown below:

Column 6, Line 25, in "88Pa" delete "P".

Signed and Sealed this

Nineteenth Day of October 1976

[SEAL]

Attest:

RUTH C. MASON
Attesting Officer

C. MARSHALL DANN
Commissioner of Patents and Trademarks